Feb. 10, 1948. J. H. WORTHEN 2,435,949
BORE GAUGE
Filed Sept. 2, 1943
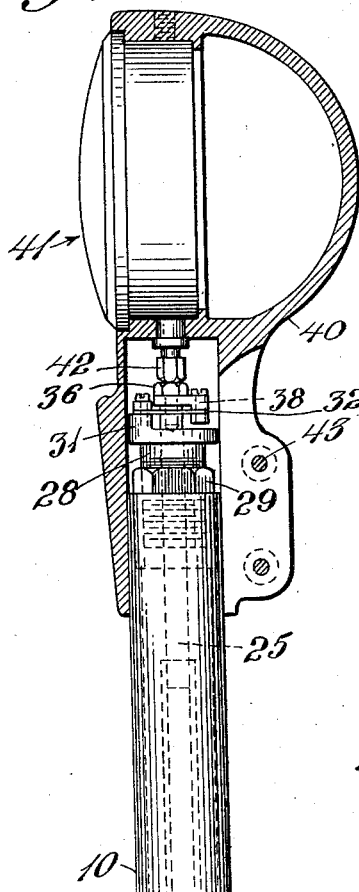
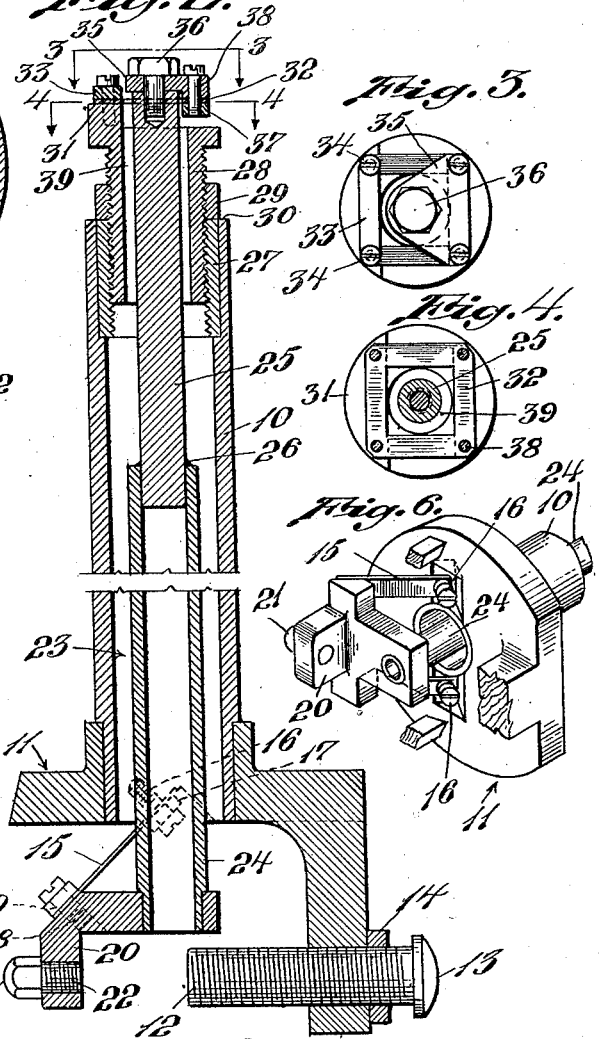
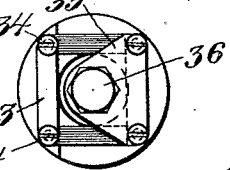
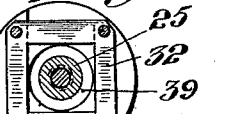
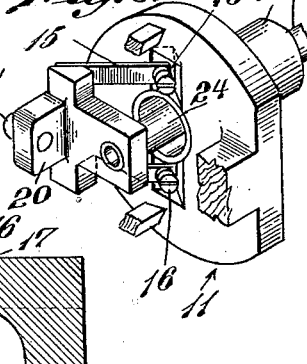
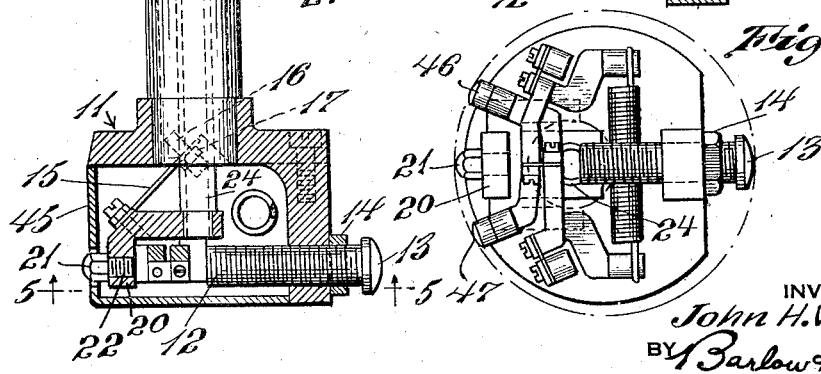
INVENTOR
John H. Worthen
BY Barlow & Barlow
ATTORNEYS Patented Feb. 10, 1948

2,435,949

UNITED STATES PATENT OFFICE 2,435,949

BORE GAUGE

John H. Worthen, Providence, R. I., assignor to Federal Products Corporation, a corporation of Rhode Island Application September 2, 1943, Serial No. 501,015

2 Claims. (Cl. 33—172)

This invention relates to a gage and more particularly to the means for transmission of motion by the longitudinal operation of a rod for transmitting measuring movement in the gage.

In the use of gages motion is sometimes transmitted from the end of a longitudinally moving rod by a bellows arrangement which may very easily get out of adjustment by being struck so that the parts are stretched beyond their elastic limits. In other cases the rod may be mounted by means of a helically arranged spring as shown in Patent 2,253,803, dated Aug. 26, 1941, but in this arrangement it is found that lateral movement of the rod relative to the tubular body in which it operates may occur, which is disadvantageous. In both of these constructions abovementioned a certain amount of friction exists which it is desirable to eliminate or minimize as far as possible.

One of the objects of this invention is to provide a mounting for a rod in a body which will so function that a substantial repeat of the dial indicator will exist in both directions of swing of the indicator hand.

Another object of the invention is to provide a rod which will be mounted in the body so that no friction will be exerted by any sliding or moving parts one relative to the other in the movement of the rod relative to the body.

Another object of this invention is to provide a means of mounting a rod in a body part so that the rod may have longitudinal movement but will be confined against movement laterally.

Another object of this invention is to provide a resilient mounting of the rod with a minimum amount of friction so that some tension will be applied on the rod when moved from normal position tending to return it to normal position.

With these and other objects in view, the invention consists of certain novel features of construction, as will be more fully described and particularly pointed out in the appended claims.

In the accompanying drawings:

Fig. 1 is an elevational view partly in section of a gage equipped with this invention;

Fig. 2 is a fragmental showing in section of this gage on a larger scale to illustrate the mounting of the motion transmitting rod and the body of the gage;

Fig. 3 is a plain view on line 3—3 of Fig. 2;

Fig. 4 is a section of line 4—4 of Fig. 2;

Fig. 5 is a section of line 5—5 of Fig. 1;

Fig. 6 is a perspective view with parts broken away of the head of the gage.

In proceeding with this invention the endwise or longitudinally moving rod which transmits motion from the measuring of contacts to the dial gage moves through a tubular body in which it must be supported. The support consists of a leaf spring extending from the body to the rod which flexes in a hinged type movement to permit freedom of longitudinal movement of the rod in the body without friction while this leaf spring confines the movement of the rod laterally so that no movement can exist in one lateral plane while but a very slight movement will occur in a lateral plane at right angles thereto. The leaf spring is divided so that it is positioned on either side of the rod and gives a very secure mounting therefore.

With reference to the drawing 10 designates generally the body which consists of a tube of suitable length to which a framework 11 is secured at one end, the framework having a threaded fixed contact member 12 with an engaging end 13 held in position in the frame by check nut 14. A leaf spring 15 is secured at one end in a recess in the frame by means of the bolt 16 and lock nut 17 while at its other end the bolt 18 and lock nut 19 secures the spring 15 to the carrier 20 for the movable contact 21 which may be threadedly secured to this carrier as at 22. The carrier 20 is also secured to one end of the rod 23 consisting of a lower hollow section 24 and an upper solid section 25 suitably secured together as by welding 26. The spring 15 is at an angle of 45 degrees to the rod 23 and is substantially in line with the point of engagement of the contact or stud 21.

The upper end of the motion transmitting rod 23 is secured to the tubular body through a resilient means which is the subject of this invention. In the upper end of this tubular body there is a bushing 27 which receives the threaded collar 28 held in position by the check nut 29 abutting the upper end 30 of the tubular body 10. Collar 28 is hollow having a tubular bore 39 of a size much larger than the upper portion 25 of the rod 23 so as to permit freedom of movement of the rod therein and there extends outwardly from the collar a mounting projection 31 upon which a leaf spring 32 (see Fig. 4) in the form of a hollow square is secured by means of the binding member 33 and the bolts 34 passing through this binding member and through the leaf spring. A cap 35 is held on the upper end of the rod by means of a cap screw 36 and to this cap the spring 32 is secured by the binding member 37 and screws 38. From this arrangement it will appear that the leaf spring in the form of a hollow square has its two opposite sides forming two spacer portions with one spacer connected to the body by being bound along its length while the opposite spacer side of the square is bound along the length of its extent to a part rigidly fixed to the rod. The other two arms of the square form in effect two leaf springs which extend between these two parts and are free to flex in a hinge-like manner by a bending of the leaf spring at any point between the two bound ends thereof.

It will be apparent that as movement from the contact point 21 occurs inwardly or to the right as shown in Figure 2 the rod will move downwardly and also slightly to the right at its lower end while the portions of the leaf spring 32 will likewise flex permitting this movement of the rod downwardly and theoretically slightly to the left as shown in Figure 2 while in a plane at right angles to this motion to the right or left no lateral movement whatsoever can occur as neither of the springs will bend laterally of their normal flexure.

On the upper end of the tubular body I may mount a casing 40 having a dial indicator as at 41 and a feeler 42 to contact the ends of the screw 36 above described. The casing 40 may be adjusted along the tubular body and held in plane by clamping means 43 in the desired location.

A suitable closing casing 45 may enclose the movable feeler mechanism above described and itself carry aligning contacts 46 and 47 operated by suitable mechanism more completely described and claimed in Patent Number 2,385,122, granted September 18, 1945.

I claim:

1. In a gage, a tubular body, a rod located in the body and out of contact therewith, said rod having a feeler contact at one end thereof for engagement with work to be gaged, leaf springs for supporting said rod at its opposite ends from said body, one end of said rod being supported by a pair of said springs at a location such that its axis will be positioned inwardly of both ends of the fastened end portions of both of said pair of springs and midway between the springs.

2. In a gage, a tubular body, a rod located in the body and out of contact therewith, said rod having a feeler contact at one end thereof for engagement with work to be gaged, leaf springs for supporting said rod at its opposite ends from said body, one end of said rod being supported by a pair of said springs at a location such that its axis will be positioned substantially midway between both ends of the fastened end portions of both of said pair of springs and midway between the springs.

JOHN H. WORTHEN.

REFERENCES CITED

The following references are of record in the file of this patent:

UNITED STATES PATENTS

| Number | Name | Date |
| --- | --- | --- |
| 1,963,310 | Nichols | June 19, 1934 |
| 2,177,605 | Whittemore | Oct. 24, 1939 |
| 2,197,198 | Street | Apr. 16, 1940 |
| 2,210,970 | Bonell | Aug. 13, 1940 |
| 2,299,997 | Ladrach | Oct. 27, 1942 |